US010300648B2

(12) United States Patent
Ishii et al.

(10) Patent No.: US 10,300,648 B2
(45) Date of Patent: May 28, 2019

(54) METHOD FOR PRODUCING A POLYOLEFIN STRUCTURE

(71) Applicant: Mitsubishi Gas Chemical Company, Inc, Tokyo (JP)

(72) Inventors: Kentaro Ishii, Kanagawa (JP); Tomonori Kato, Kanagawa (JP); Jun Mitadera, Kanagawa (JP); Kenji Kouno, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 486 days.

(21) Appl. No.: 14/917,528

(22) PCT Filed: Aug. 29, 2014

(86) PCT No.: PCT/JP2014/072797
§ 371 (c)(1),
(2) Date: Mar. 8, 2016

(87) PCT Pub. No.: WO2015/037459
PCT Pub. Date: Mar. 19, 2015

(65) Prior Publication Data

US 2016/0214305 A1 Jul. 28, 2016

(30) Foreign Application Priority Data

Sep. 11, 2013 (JP) ................................ 2013-188301

(51) Int. Cl.
*B29C 47/80* (2006.01)
*B29C 47/82* (2006.01)
(Continued)

(52) U.S. Cl.
CPC ........ *B29C 47/827* (2013.01); *B29C 47/0023* (2013.01); *B29C 47/0054* (2013.01);
(Continued)

(58) Field of Classification Search
CPC ... B29C 47/786; B29C 47/802; B29C 47/822; B29C 47/842; B29C 47/862;
(Continued)

(56) References Cited

U.S. PATENT DOCUMENTS

2005/0143519 A1 6/2005 Maruo et al.
2009/0092778 A1* 4/2009 Maruyama .............. C08L 67/02 428/35.7
(Continued)

FOREIGN PATENT DOCUMENTS

EP 2647483 A1 10/2013
EP 2684915 A1 1/2014
(Continued)

OTHER PUBLICATIONS

International Search Report dated Oct. 7, 2014 for PCT/JP2014/072797 and English translation of the same. (4 pages).

*Primary Examiner* — Timothy Kennedy
(74) *Attorney, Agent, or Firm* — Fitch, Even, Tabin & Flannery LLP

(57) ABSTRACT

The production method for a polyolefin-based structure of the present invention produces a polyolefin-based structure from a mixed source material containing a polyolefin (A), an acid-modified polyolefin (B) and a gas barrier resin (C) using a molding machine 10, under the condition mentioned below. The molding machine 10 is equipped with a single-screw extruder 11, a die head 12, and an adaptor 13 for feeding the mixed source material from the single-screw extruder 11 to the die head 12. Am+10° C.≤T1≤Cm−10° C. (1), Cm−30° C.≤T2≤Cm+30° C. (2), Cm−10° C.≤T3≤Cm+50° C. (3), Cm−30° C.≤T4≤Cm+30° C. (4). T1 is a cylinder temperature in a section corresponding to a supply zone 21A and a compression zone 21B, T2 is a cylinder temperature in a section corresponding to a metering zone 21C, T3 is a temperature of an adaptor 13, T4 is a temperature of a die
(Continued)

head, Am is the melting point of the component (A), and Cm is the melting point of the component (C).

16 Claims, 4 Drawing Sheets

(51) Int. Cl.
*B29C 47/92* (2006.01)
*B29C 47/00* (2006.01)
*B29C 47/20* (2006.01)
*B29K 23/00* (2006.01)

(52) U.S. Cl.
CPC .............. *B29C 47/20* (2013.01); *B29C 47/92* (2013.01); *B29C 2947/92704* (2013.01); *B29K 2023/065* (2013.01); *B29K 2995/0067* (2013.01)

(58) Field of Classification Search
CPC ....... B29C 47/78; B29C 47/784; B29C 47/80; B29C 47/82; B29C 47/84; B29C 47/86; B29C 47/0054
See application file for complete search history.

(56) References Cited

U.S. PATENT DOCUMENTS

2010/0215879 A1* 8/2010 Dooley ............... B29C 47/0023 428/35.7
2013/0251927 A1 9/2013 Kouno et al.

FOREIGN PATENT DOCUMENTS

| | | | |
|---|---|---|---|
| JP | H04-363225 | A | 12/1992 |
| JP | 2005-206806 | A | 8/2005 |
| JP | 2011-162684 | A | 8/2011 |
| WO | 2012/073969 | A1 | 6/2012 |
| WO | 2013/002022 | A1 | 1/2013 |

* cited by examiner (a)

(b)

METHOD FOR PRODUCING A POLYOLEFIN STRUCTURE

CROSS-REFERENCE TO RELATED APPLICATIONS

This application is a U.S. national phase application filed under 35 U.S.C. § 371 of International Application PCT/JP2014/072797 filed on Aug. 29, 2014, designating the United States, which claims priority from Japanese Application Number 2013-188301, filed Sep. 11, 2013, which are hereby incorporated herein by reference in their entirety.

TECHNICAL FIELD

The present invention relates to a method for producing a polyolefin-based structure containing a gas barrier resin.

BACKGROUND ART

Containers for storing hydrocarbons or various chemicals or pipes for transporting these materials include, for example, bottles for chemicals, fuel tanks for automobiles or small size engines, fuel pipes, etc. Many of the metals or glasses conventionally used as raw materials of these members have been now replaced with a plastic material as an alternative material. The plastic material has advantages such as a light weight, no need of a rust-proof treatment, less breakage, and a high degree of freedom of shape as compared with metals or glasses.

In most of the above applications, a high-density polyethylene (hereinafter sometimes abbreviated as "HDPE") is used. HDPE has excellent mechanical strength, molding processability, and economical efficiency. However, HDPE has a disadvantage that an article stored in a container is likely to permeate through the HDPE wall and to be scattered in the air. Consequently, there is an increasing demand for a technique of enhancing the barrier performance of containers formed of a polyolefin such as HDPE or the like.

For example, as a method of enhancing the fuel barrier performance of an HDPE container, there is known a method of producing a single-layer container from a mixed source material prepared by blending a polyolefin with a gas barrier resin containing a metaxylylene group-containing polyamide for imparting barrier performance to containers and a modified polyethylene for adhering the polyolefin and the gas barrier resin (for example, see PTL 1).

In PTL 1, a mixed resin is kneaded in a single-screw extruder, then fed to a die via an adaptor or the like, and thereafter extruded out through the die to form a container. On this occasion, temperature conditions and the like of the single-screw extruder, the die, the adaptor and others are suitably set, so that the gas barrier resin is dispersed in a form of layers in the container obtained by extrusion through the die.

According to the method of PTL 1, any equipment for producing conventional HDPE containers may be used almost directly as such and, in addition, due to layer-like dispersion of the gas barrier resin, barrier performance comparable to that of multi-layer structures can be imparted to the produced containers. Moreover, the resin material that constitutes the mill ends and the purge waste formed in producing the containers is the same as the resin material that constitutes the containers, and therefore can be reused as a recycled material for the material to constitute the containers.

CITATION LIST

Patent Literature

PTL 1: WO2012/073969

SUMMARY OF INVENTION

However, in PTL 1, the temperature of the cylinder of the single-screw extruder is set in accordance with the melting point of a metaxylylene group-containing polyamide which is a gas barrier resin, but the temperature setting is not investigated including the temperature of the die and that of the adaptor. Consequently, for example, there is a problem that the gas barrier resin is dispersed more than necessary during molding, so that the barrier performance of the containers could not be sufficiently enhanced. In addition, there is another problem that the usable screw shape is limited, so that the latitude in choosing equipment is narrow.

The present invention has been made in consideration of the above-mentioned problems, and the problem to be solved by the present invention is to increase the barrier performance in producing polyolefin containers and the like where a gas barrier resin such as a metaxylylene group-containing polyamide or the like is dispersed in a form of layers, without specifically limiting the screw shape.

The present inventors have assiduously studied and, as a result, have found that, while a gas barrier resin whose melting point is higher than that of a polyolefin is not softened more than necessary in a single-screw extruder, the gas barrier resin is fully softened by sufficiently turning up the temperature of an adaptor, so that the gas barrier resin can be suitably dispersed in a form of layers in the mixed resin extruded out through the die, thereby enhancing the barrier performance of the polyolefin-based structure, and have completed the present invention to be described below.

Specifically, the present invention provides the following [1] to [16].

[1] A method for producing a polyolefin-based structure from a mixed source material containing 60 to 90% by mass of a polyolefin (A), 5 to 35% by mass of an acid-modified polyolefin (B) and 5 to 35% by mass of a gas barrier resin (C) composed of polyamide, using a molding machine, wherein:

the molding machine is equipped with a single-screw extruder which has a screw running inside a cylinder, a die head and a communication portion for feeding the mixed source material from the single-screw extruder to the die head, and the mixed source material is extruded out through the molding machine under the temperature condition satisfying the following (1) to (4) to give a polyolefin-based structure in which the gas barrier resin (C) is dispersed in a form of layers in the polyolefin (A):

$$Am+10° \text{ C.} \le T1 \le Cm-10° \text{ C.} \quad (1)$$

$$Cm-30° \text{ C.} \le T2 \le Cm+30° \text{ C.} \quad (2)$$

$$Cm-10° \text{ C.} \le T3 \le Cm+50° \text{ C.} \quad (3)$$

$$Cm-30° \text{ C.} \le T4 \le Cm+30° \text{ C.} \quad (4)$$

wherein T1 is a cylinder temperature in a section corresponding to a supply zone and a compression zone of the screw in the single-screw extruder; T2 is a cylinder temperature in a section corresponding to a metering zone of the screw in the single-screw extruder; T3 is a temperature of the communication portion; T4 is a temperature of the die head; Am is a melting point of the polyolefin (A); and Cm is a melting point of the gas barrier resin (C).

[2] The method for producing a polyolefin-based structure according to the above [1], wherein the temperature T2 is lower than the melting point Cm of the gas barrier resin (C).

[3] The method for producing a polyolefin-based structure according to the above [1] or [2], wherein the melting point (Cm) of the gas barrier resin (C) is higher than the melting point (Am) of the polyolefin (A) and the melting point difference (Cm−Am) is 20 to 150° C.

[4] The method for producing a polyolefin-based structure according to any of the above [1] to [3], wherein a temperature T5 of the resin being extruded out through the discharge port of the die head satisfies the following formula (5):

$$Cm-30° \text{ C.} \le T5 \le Cm-5° \text{ C.} \quad (5).$$

[5] The method for producing a polyolefin-based structure according to any of the above [1] to [4], wherein the screw has a barrier-type mixing section in the metering zone, and the temperature T2 satisfies the following condition:

$$Cm-30° \text{ C.} \le T2 \le Cm-5° \text{ C.}$$

[6] The method for producing a polyolefin-based structure according to any of the above [1] to [5], wherein the die head has two or more die holes.

[7] The method for producing a polyolefin-based structure according to any of the above [1] to [6], wherein the mixed source material contains 1 to 60% by mass of a recycled resin obtained from a resin solid generated in a production step for the polyolefin-based structure.

[8] The method for producing a polyolefin-based structure according to any of the above [1] to [7], wherein a melt flow rate of the polyolefin (A) is 0.01 to 10 (g/10 min).

[9] The method for producing a polyolefin-based structure according to any of the above [1] to [8], wherein a melt flow rate of the acid-modified polyolefin (B) is 0.1 to 10 (g/10 min).

[10] The method for producing a polyolefin-based structure according to any of the above [1] to [9], wherein an acid value of the acid-modified polyolefin (B) is 2 to 30 mg/g.

[11] The method for producing a polyolefin-based structure according to any of the above [1] to [10], wherein the gas barrier resin (C) is a metaxylylene group-containing polyamide.

[12] The method for producing a polyolefin-based structure according to the above [11], wherein a relative viscosity of the metaxylylene group-containing polyamide is 1.5 to 4.5.

[13] The method for producing a polyolefin-based structure according to the above [11] or [12], wherein a water content of the metaxylylene group-containing polyamide is 0.001 to 0.5%.

[14] The method for producing a polyolefin-based structure according to any of the above [11] to [13], wherein a free volume of the metaxylylene group-containing polyamide, as measured according to a positron annihilation technique, is 0.045 to 0.060 $nm^3$.

[15] The method for producing a polyolefin-based structure according to any of the above [1] to [14], wherein the polyolefin-based structure is a hollow molded article.

[16] The method for producing a polyolefin-based structure according to any of the above [1] to [15], wherein the polyolefin-based structure is a sheet-molded article or a thermoformed article thereof.

According to the production method for a polyolefin-based structure of the present invention, there can be provided a polyolefin-based structure excellent in barrier performance not limiting the screw shape.

DESCRIPTION OF EMBODIMENTS

Figure 1:
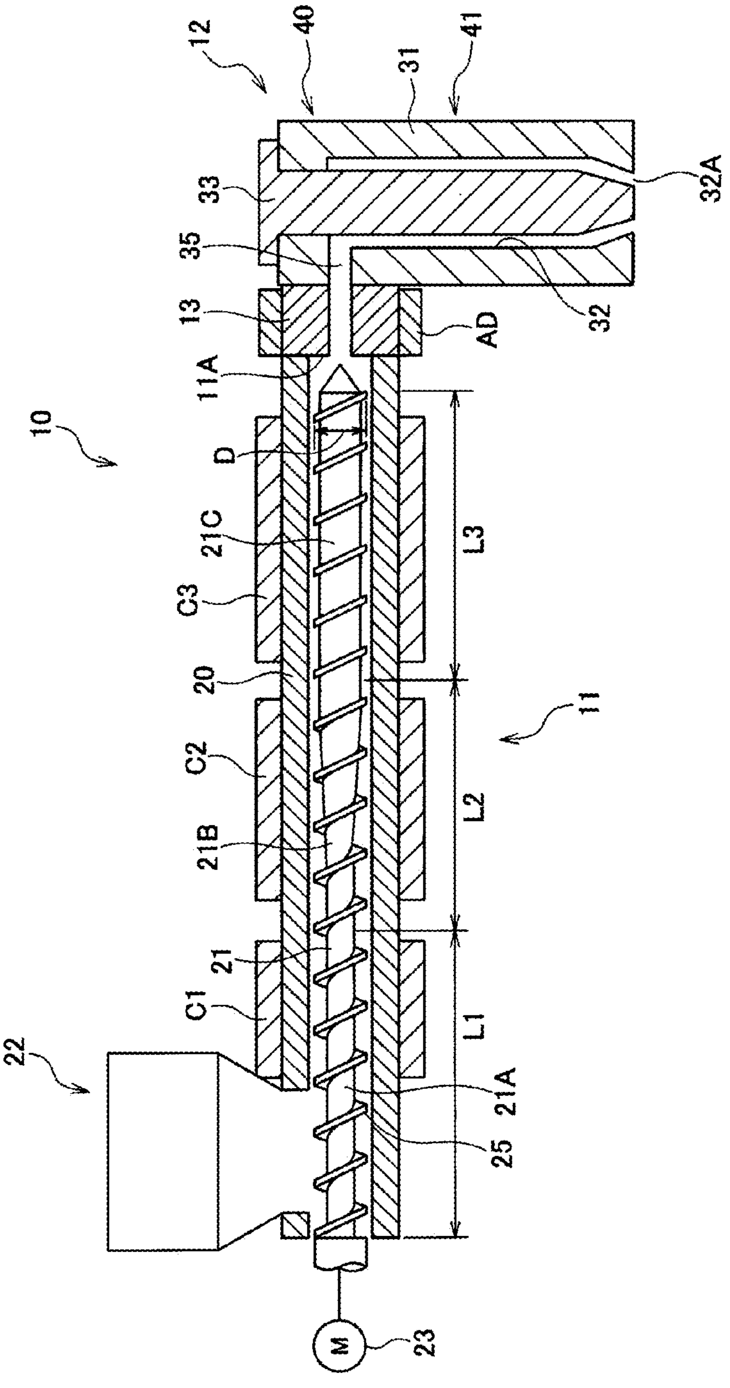
FIG. 1 is a schematic cross-sectional view showing a molding machine for use in one embodiment of the present invention.
Figure 2A:
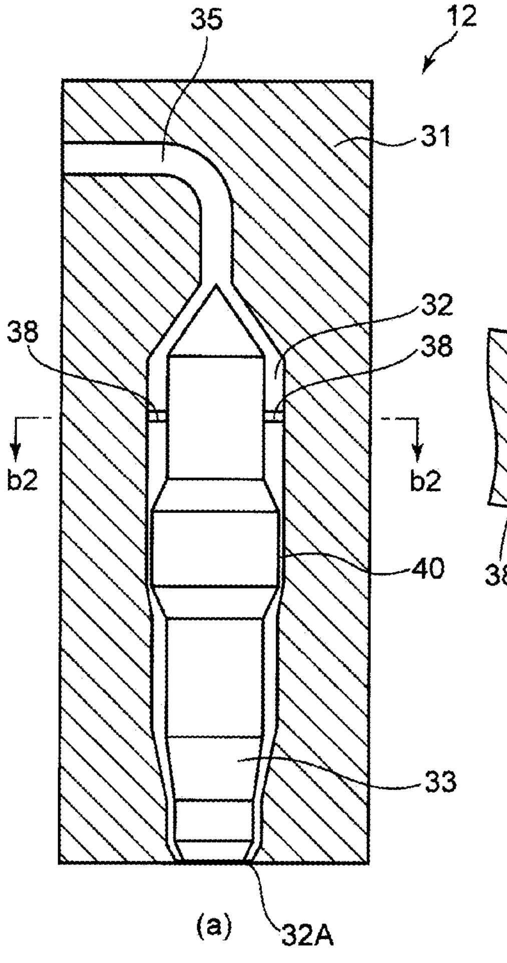
FIG. 2A is a vertical cross-sectional view showing a die head for use in one embodiment of the present invention.
Figure 2B:
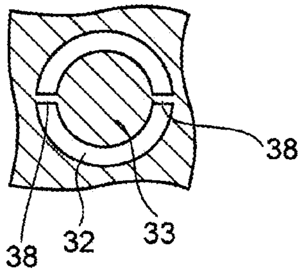
FIG. 2B is a horizontal cross-sectional view at b2-b2.

Hereinafter, embodiments of the present invention will be described.

[Mixed Source Material]

The polyolefin-based structure in the present invention is formed from a mixed source material containing a polyolefin (A), an acid-modified polyolefin (B) and a gas barrier resin (C).

The constituent components contained in the mixed source material are described in detail hereinunder.

(Polyolefin (A))

The polyolefin (A) is a main material to constitute molded articles, and any one usable as the material to constitute molded articles can be used with no limitation. Examples of the polyolefin (A) usable in the present invention include polyethylenes as typified by low-density polyethylene, middle-density polyethylene, high-density polyethylene, linear low-density polyethylene, etc.; polypropylenes as typified by propylene homopolymer, ethylene-propylene block copolymer, ethylene-propylene random copolymer, etc.; homopolymers of an ethylenic hydrocarbon having 2 or more carbon atoms, such as 1-polybutene, 1-polymethylpentene, etc.; homopolymers of an α-olefin having 3 to 20 carbon atoms; copolymers of α-olefins having 3 to 20 carbon atoms; copolymers of an α-olefin having 3 to 20 carbon atoms and a cyclic olefin, etc.

Melt flow rate (MFR) is one typical index of the melt viscosity and the molecular weight of polyolefin. The polyolefin (A) for use in the present invention has, for example, a melt flow rate (MFR) of 0.01 to 10 (g/10 min). The optimum range of MFR of the polyolefin (A) varies in accordance with the production method for structures. For example, in the case where the structure is a hollow container produced according to a direct blow method, MFR is preferably 0.01 to 1 (g/10 min), more preferably 0.02 to 0.9 (g/10 min), even more preferably 0.05 to 0.9 (g/10 min). In the case where the structure is a sheet molded article produced according to a T-die method, MFR is preferably 0.01 to 10 (g/10 min), more preferably 0.5 to 5 (g/10 min), even more preferably 1 to 3 (g/10 min). MFR is a value measured according to JIS K7210.

The molding temperature in the present invention is high as compared with that in molding a polyolefin alone, and the gas barrier resin (C) generally has a larger density than polyolefin, and therefore, in the case of a direct blow method, the polyolefin mixed with the gas barrier resin (C) tends to undergo great drawdown in molding, as compared with the case of polyolefin alone. Consequently, in the present invention, MFR of the polyolefin (A) is controlled to be not more than 1 to thereby prevent drawdown in molding according to a direct blow method and, as a result, the thickness accuracy of the resultant structures can be more excellent. When MFR of the polyolefin (A) is 0.01 or more, the melt viscosity could be suitable for molding and, in addition, the dispersion condition of the gas barrier resin (C) in the mixed resin constituting the resultant structure could be bettered and, as a result, molded articles excellent in barrier performance can be obtained.

The melting point (Am) of the polyolefin (A) is, but not limited to, for example, 100 to 180° C., preferably 125 to 170° C. or so.

The polyolefin (A) is preferably any of the above-mentioned polyethylenes or polypropylenes, and a high-density polyethylene (HDPE) is more preferably used.

The high-density polyethylene (HDPE) is a polyethylene having a density of 0.942 $g/cm^3$ or more, and the density is preferably 0.97 $g/cm^3$ or less, more preferably 0.945 to 0.96 $g/cm^3$. Polyethylene could have sufficient crystallinity when having a high density, and irrespective of the type of the contents to be stored in structures, the polyethylene of the type enables storing of contents. When the density is 0.97 $g/cm^3$ or less, the polyethylene (A) is not brittle like glass, and therefore can exhibit practicable strength as structures.

These polyolefins can be used as the polyolefin (A) alone to constitute the polyolefin-based structure, or can be used as a mixture of two or more different types of them. Most preferably, a high-density polyethylene single substance is used.

In the polyolefin (A), additives such as an antioxidant, a matting agent, a heat-resistant stabilizer, a weathering stabilizer, an ultraviolet absorber, a nucleating agent, a plasticizer, a flame retarder, an antistatic agent, a color protector, and a lubricant can be added without detracting from the effect of the invention. Without being limited to these additives, various materials may be combined.

(Acid-Modified Polyolefin (B))

The acid-modified polyolefin (B) used in the present invention can be a polyolefin grafting-modified with an unsaturated carboxylic acid or the anhydride thereof, which is widely used as an adhesive resin in general. As the polyolefin, those exemplified hereinabove for the polyolefin (A) can be used. Polypropylene and polyethylene are preferably used, and polyethylene is more preferably used. Preferably, the acid-modified polyolefin (B) is one prepared by modifying the same type of polyolefin as that of the polyolefin (A). Specifically, in the case where the polyolefin (A) is a polyethylene, the acid-modified polyolefin (B) is preferably one prepared by modifying polyethylene; and in the case where the polyolefin (A) is a polypropylene, the acid-modified polyolefin (B) is preferably one prepared by modifying polypropylene.

Specific examples of the unsaturated carboxylic acid and the anhydride thereof include acrylic acid, methacrylic acid, α-ethyl acrylic acid, maleic acid, fumaric acid, itaconic acid, citraconic acid, tetrahydro phthalic acid, chloro-maleic acid, butenyl-succinic acid, and the anhydrides thereof. In particular, maleic acid and maleic anhydride are preferably used. Various known methods of graft-copolymerizing the polyolefin with the unsaturated carboxylic acid or the anhydride thereof is used to obtain an acid-modified polyolefin. For example, there can be mentioned a method of melting a polyolefin in an extruder or the like followed by copolymerizing with a graft monomer added thereto, a method of dissolving a polyolefin in a solvent followed by copolymerizing with a graft monomer added thereto, and a method of preparing an aqueous suspension of a polyolefin followed by copolymerizing with a graft monomer added thereto.

In the present invention, the acid-modified polyolefin (B) plays a role of adhering the polyolefin (A) to the gas barrier resin (C). In the mixed resin to constitute the structure in the present invention, the gas barrier resin (C) such as a metaxylylene group-containing polyamide or the like is considered to chemically bond to the acid-modified substituent in the acid-modified polyolefin (B) and, as a result, the gas barrier resin (C) could exist near the acid-modified polyolefin (B) to change the adhesion power owing to the difference in the acid modification rate.

The index of the acid modification rate of the acid-modified polyolefin (B) is an acid value, and the acid value in the present invention is measured according to the method described in JIS K0070. In the present invention, the acid value of the acid-modified polyolefin (B) is preferably 2 to 30 mg/g.

When the acid value of the acid-modified polyolefin (B) is 2 mg/g or more, the adhesiveness between the polyolefin (A) and the gas barrier resin (C) in the resin composition is bettered and there occur few voids in the adhering interface between the two. Consequently, the barrier performance and the mechanical strength of the olefin structures to be obtained can be readily bettered, and when dropped down, the containers hardly break.

When the acid value of the acid-modified polyolefin (B) is 30 mg/g or less, the acid-modified polyolefin (B) and the gas barrier resin (C) may be hardly localized, and in the case of containers to be molded according to a direct blow method, the inner surface can be prevented from being roughened and the thickness can also be prevented from being uneven and, as a result, the barrier performance and the mechanical strength of the containers can be readily bettered.

From the above-mentioned viewpoints, the acid value of the acid-modified polyolefin (B) is more preferably 3 to 20 mg/g.

The gas barrier resin (C) is generally a relatively hard material and therefore when the structure is given shock, there may readily occur cracks or peelings in the interface so that the strength and the barrier performance of the structure may be thereby worsened. Consequently, when those having a relatively low viscosity and having a relatively soft texture are used as the acid-modified polyolefin (B) in the present invention, the impact strength caused by the gas barrier resin (C) can be lowered and the practical strength of the structure can be thereby effectively held.

From these viewpoints, the density of the acid-modified polyolefin (B) for use in the present invention is preferably 0.89 to 0.96 $g/cm^3$, more preferably 0.90 to 0.945 $g/cm^3$, even more preferably 0.91 to 0.93 $g/cm^3$. When the density of the acid-modified polyolefin (B) is 0.89 $g/cm^3$ or more, the compatibility with the polyolefin (A) is good and further the adhesiveness to the gas barrier resin (C) increases, whereby the strength and the barrier performance of the structure can be excellent. When the density of the acid-modified polyolefin (B) is 0.96 $g/cm^3$ or less, the acid-modified polyolefin (B) can be suitably soft and therefore, even when the structure is given shock, the strength and the barrier performance thereof can be prevented from degrading.

Regarding MFR of the acid-modified polyolefin (B) for use in the present invention, preferably, the melt viscosity thereof is high from the viewpoint of maintaining the molding stability and the strength of the structure. MFR, as the value measured according to the method described in JIS K7210, is preferably 0.1 to 10 (g/10 min), more preferably 0.1 to 8 (g/10 min), even more preferably 0.2 to 3 (g/10 min).

The melting point (Bm) of the acid-modified polyolefin (B) is, though not limited thereto, for example 110 to 180° C., preferably 115 to 170° C. or so.

Further, additives such as an antioxidant, a matting agent, a heat-resistant stabilizer, a weathering stabilizer, an ultraviolet absorber, a nucleating agent, a plasticizer, a flame retarder, an antistatic agent, a color protector, and a lubricant can be added to the acid-modified polyolefin (B), without detracting from the effect of the invention. Without being limited to these additives, various materials may be combined.

(Gas Barrier Resin (C))

The gas barrier resin (C) for use in the present invention is a resin more excellent in gas barrier performance than the polyolefin (A), and concretely includes a polyamide.

Examples of the polyamide include a metaxylylene group-containing polyamide, nylon 6, nylon 66, nylon 666, nylon 610, nylon 11, nylon 12, etc. Among these, a metaxylylene group-containing polyamide, nylon 6, nylon 666 and the like are preferred, and from the viewpoint of the ability thereof to readily improve barrier performance, a metaxylylene group-containing polyamide is especially preferred.

The metaxylylene group-containing polyamide is formed of, for example, a diamine unit and a dicarboxylic acid unit, in which the diamine unit has a structural unit derived from metaxylylenediamine. The diamine unit constituting the metaxylylene group-containing polyamide contains, from the viewpoint of gas barrier performance, a metaxylylenediamine unit preferably in an amount of 70 mol % or more, more preferably 80 mol % or more, even more preferably 90 mol % or more.

In the metaxylylene group-containing polyamide, examples of the compound capable of constituting the other diamine unit than the metaxylylenediamine unit include, though not limited thereto, an aromatic ring-having diamine such as paraxylylenediamine, etc.; an alicyclic structure-having diamine such as 1,3-bis(aminomethyl)cyclohexane, 1,4-bis(aminomethyl)cyclohexane, etc.; an aliphatic diamine such as tetramethylenediamine, hexamethylenediamine, nonamethylenediamine, 2-methyl-1,5-pentanediamine, polyoxyalkylene-amine, polyether diamine, etc.

The dicarboxylic acid unit constituting the metaxylylene group-containing polyamide contains, from the viewpoint of crystallinity, an α,ω-aliphatic dicarboxylic acid unit preferably in an amount of 50 mol % or more, more preferably 60 mol % or more, even more preferably 70 mol % or more.

The compound to constitute the α,ω-aliphatic dicarboxylic acid unit includes suberic acid, adipic acid, azelaic acid, sebacic acid, dodecanoic acid, etc. From the viewpoint of gas barrier performance and crystallinity, adipic acid and sebacic acid are preferably used.

Examples of compound capable of constituting the other dicarboxylic acid unit than the α,ω-aliphatic dicarboxylic acid unit include, though not limited thereto, alicyclic dicarboxylic acids such as 1,3-cyclohexanedicarboxylic acid, 1,4-cyclohexanedicarboxylic acid, etc.; aromatic dicarboxylic acids such as terephthalic acid, isophthalic acid, orthophthalic acid, xylylenedicarboxylic acid, naphthalenedicarboxylic acid, etc.

Among these, isophthalic acid and 2,6-naphthalenedicarboxylic acid are preferred as capable of readily producing polyamides excellent in barrier performance not interfering with the polycondensation reaction in production of metaxylylene group-containing polyamides. In the case where the metaxylylene group-containing polyamide has a dicarboxylic acid unit derived from isophthalic acid and/or 2,6-naphthalenedicarboxylic acid, the content of the dicarboxylic acid unit derived from isophthalic acid and/or 2,6-naphthalenedicarboxylic acid is, from the viewpoint of the dispersibility of the metaxylylene group-containing polyamide in the polyolefin-based structure and of the barrier performance of the structure, preferably 30 mol % or less of the total dicarboxylic acid unit, more preferably 20 mol % or less, even more preferably 15 mol % or less.

In addition to the above-mentioned diamine unit and dicarboxylic acid unit, other compounds of lactams such as ε-caprolactam, laurolactam, etc., aliphatic aminocarboxylic acids such as aminocaproic acid, aminoundecanoic acid, etc., aromatic aminocarboxylic acids such as p-aminomethylbenzoic acid, etc., may be used as the copolymer unit to constitute the metaxylylene group-containing polyamide, within a range not detracting from the effect of the present invention.

The metaxylylene group-containing polyamide may be produced according to a melt polycondensation method (melt polymerization method). For example, there is a method where a nylon salt of a diamine and a dicarboxylic acid is heated under pressure in the presence of water, and polymerized in a melt state while the added water and the condensed water are removed. According to a method of directly adding a diamine to a dicarboxylic acid in a melt state for polycondensation is also employable. In this case, for keeping the reaction system to be in a uniform liquid state, a diamine is continuously added to a dicarboxylic acid and during this, polycondensation is carried out while the reaction system is heated so that the reaction temperature is not lower than the melting point of the oligoamide and the polyamide being produced.

In the polycondensation system for the metaxylylene group-containing polyamide, a phosphorus atom-containing compound may be added for realizing the effect of promoting the amidation reaction and the effect of preventing coloration during polycondensation.

The phosphorus atom-containing compound includes dimethylphosphinic acid, phenylmethyl phosphinic acid, hypophosphorous acid, sodium hypophosphite, potassium hypophosphite, lithium hypophosphite, ethyl hypophosphite, phenyl phosphonous acid, sodium phenyl phosphonite, potassium phenyl phosphonite, lithium phenyl phosphonite, ethyl phenyl phosphonite, phenylphosphonic acid, ethyl phosphonic acid, sodium phenyl phosphonate, potassium phenyl phosphonate, lithium phenyl phosphonate, diethyl phenyl phosphonate, sodium ethyl phosphonate, potassium ethyl phosphonate, phosphorous acid, sodium hydrogenphosphite, sodium phosphite, triethyl phosphite, triphenyl phosphite, and pyrophosphorous acid. Among these, particularly metal hypophosphites such as sodium hypophosphite, potassium hypophosphite, and lithium hypophosphite are preferably used due to high effects on the promotion of amidation reaction and on the prevention of coloring. In particular, sodium hypophosphite is preferable. However, the phosphorus atom-containing compound that can be used in the present invention is not limited to these compounds.

The additive amount of the phosphorus atom-containing compound added in the polycondensation system for generating the metaxylylene group-containing polyamide is preferably 1 to 500 ppm, more preferably 5 to 450 ppm, further more preferably 10 to 400 ppm, equivalent to the concentration of the phosphorus atoms in the metaxylylene group-containing polyamide from the viewpoint of preventing coloration of the metaxylylene group-containing polyamide during the polycondensation.

In the polycondensation system for generating the metaxylylene group-containing polyamide, an alkali metal compound or an alkaline earth metal compound is preferably used together with the phosphorus atom-containing compound. To prevent the metaxylylene group-containing polyamide from being colored during the polycondensation, a phosphorus atom-containing compound should be present in sufficient amount. However, in order to adjust the reaction rate of the amidation, an alkali metal compound or an alkaline earth metal compound preferably coexists with the phosphorus atom-containing compound.

Such metal compounds include, for example, alkali metal/alkaline earth metal hydroxides such as lithium hydroxide, sodium hydroxide, potassium hydroxide, rubidium hydroxide, cesium hydroxide, magnesium hydroxide, calcium hydroxide, and barium hydroxide; and alkali metal/alkaline earth metal acetates such as lithium acetate, sodium acetate, potassium acetate, rubidium acetate, cesium acetate, magnesium acetate, calcium acetate, and barium acetate but can be used without being limited to these compounds.

When an alkali metal compound or an alkaline earth metal compound is added in the condensation polymerization system for generating the metaxylylene group-containing polyamide, the value determined by dividing the mole number of the compound by that of the phosphorus atom-containing compound is preferably 0.5 to 2.0, more preferably 0.6 to 1.8, further more preferably 0.7 to 1.5. Setting the additive amount of an alkali metal compound or an alkaline earth metal compound to within the above-mentioned range can achieve the effect on the promotion of amidation reaction from the phosphorus atom-containing compound and can suppress the generation of gel.

The metaxylylene group-containing polyamide obtained by the melt condensation polymerization may be once taken out and pelletized. The resultant pellets may be dried, or may be further subjected to solid-phase polymerization for increasing the degree of polymerization. As a heater used for the drying or the solid phase polymerization, a continuous heated-air dryer; rotating drum heaters such as a tumble dryer, a conical dryer, and a rotary dryer; and a conical heater internally provided with a rotor blade called a Nauta mixer can be suitably used. However, well-known methods and devices can be used without being limited to these heaters. In particular, when a polyamide is subjected to solid phase polymerization, a rotating drum heater among the above-mentioned devices is preferably used because this heater can seal the system and easily promote the condensation polymerization without the presence of oxygen that causes the coloring.

The water content of the metaxylylene group-containing polyamide for use in the present invention is preferably 0.001 to 0.5%, more preferably 0.005 to 0.4%, even more preferably 0.01 to 0.3%. When the water content of the metaxylylene group-containing polyamide is 0.5% or less, moisture can be prevented from vaporizing during molding to form bubbles in the molded article. On the other hand, with the decrease in the water content, the viscosity of the polyamide increases in a softened state and therefore the layered dispersion state could be readily maintained as such. When the water content is 0.001% or more, the drying time in producing the metaxylylene group-containing polyamide can be shortened and coloration and thermal degradation can be thereby prevented.

There are some indices of the polymerization degree of the metaxylylene group-containing polyamide, but relative viscosity is generally used. The relative viscosity of the metaxylylene group-containing polyamide used in the present invention is preferably 1.5 to 4.5, more preferably 2.0 to 4.2, further more preferably 2.5 to 4.0. With the increase in the relative viscosity thereof, the metaxylylene group-containing polyamide becomes hardly miscible with the polyolefin (A) and therefore can form a layered dispersion state. However, when the relative viscosity of the metaxylylene group-containing polyamide is increased, the polymerization time is long so that the production cost increases. Setting the relative viscosity of the metaxylylene group-containing polyamide to fall within the above-mentioned range can form a good layered dispersion state and can lower the production cost.

The relative viscosity is herein referred to as the ratio of the free-fall time (t) of 0.2 g of polyamide dissolved in 20 mL of 96% sulfuric acid to the free-fall time (t0) of 96% sulfuric acid, which is represented by the following expression. The free-fall times (t0) and (t) are measured at 25° C. with a Cannon-Fenske viscometer.

$$\text{Relative viscosity}=t/t0 \quad (8)$$

As another index than the above of the polymerization degree of the metaxylylene group-containing polyamide, a melt viscosity is used. In general, there is a correlationship between relative viscosity and melt viscosity, and in the case where the metaxylylene group-containing polyamide contains much water, hydrolysis may go on during melting to lower the melt viscosity of the polyamide. The melt viscosity of the metaxylylene group-containing polyamide for use in the present invention is, when having a moisture content falling within a range of 0.001 to 0.5%, preferably 100 to 2,000 Pa·s, more preferably 150 to 1,900 Pa·s, even more preferably 200 to 1,800 Pa·s.

The melt viscosity referred to herein is a value measured by melting the metaxylylene group-containing polyamide in a barrel set at 260° C. and then leading the resulting melt to pass through a capillary having a diameter of 1 mm and a length of 10 mm at a shear rate of 100 $sec^{-1}$, using a capillary rheometer.

Preferably, from the viewpoint of the barrier performance and physical properties thereof, the free volume of the metaxylylene group-containing polyamide for use in the present invention, as measured according to a positron annihilation technique, is 0.045 to 0.060 $nm^3$, more preferably 0.046 to 0.059 $nm^3$, even more preferably 0.047 to 0.058 $nm^3$. The free volume of the metaxylylene group-containing polyamide may vary depending on the branching of the molecular chain and on the presence of foreign substances, but when the free volume falls within the above-mentioned range, various compounds could hardly penetrate through the polyamide and the physical properties of the polyamide may better. In addition, the free volume of the metaxylylene group-containing polyamide may also vary depending on the degree of crystallinity thereof. The free volume as referred to herein means a value of the metaxylylene group-containing polyamide in the condition where the temperature-rising crystallization heat quantity thereof in DSC is within a range of 20 to 40 J/g.

The melting point (Cm) of the gas barrier resin (C) for use in the present invention is generally 150 to 250° C., preferably 190 to 240° C.

The melting point (Cm) of the gas barrier resin is higher than the melting point (Am) of the polyolefin (A), and the melting point difference (Cm−Am) is preferably 20 to 150° C., more preferably 50 to 120° C. In the present invention, the melting point difference between the component (C) and the component (A) is large as above, and therefore the production method to be mentioned below can be more suitably carried out.

Similarly, the melting point (Cm) of the gas barrier resin (C) is higher than the melting point (Bm) of the acid-modified polyolefin (B), and the melting point difference (Cm−Bm) therebetween is preferably 20 to 150° C., more preferably 50 to 120° C.

Additives such as an antioxidant, a matting agent, a heat-resistant stabilizer, a weathering stabilizer, an ultraviolet absorber, a nucleating agent, a plasticizer, a flame retarder, an antistatic agent, a color protector, a lubricant, a gelling inhibitor, and also clay such as layered silicate as well as nanofiller and the like can be added to gas barrier resin (C) without detracting from the effect of the invention. In addition, for the purpose of modifying the gas barrier resin (C), if desired, a polyolefin or its modified resin as well as an elastomer having styrene in the skeleton may also be added. Not limited to those shown in the above, any other various materials may be mixed.

(Blending Ratio of Materials)

Regarding the blending ratio of the materials constituting the structure of the present invention, the polyolefin (A) is, relative to the entire amount of the mixed source material to constitute the structure, 60 to 90% by mass, the acid-modified polyolefin (B) is 5 to 35% by mass, and the gas barrier resin (C) is 5 to 35% by mass. Preferably, the polyolefin (A) is 65 to 90% by mass, the acid-modified polyolefin (B) is 5 to 30% by mass, and the gas barrier resin (C) is 5 to 30% by mass, more preferably, the polyolefin (A) is 70 to 90% by mass, the acid-modified polyolefin (B) is 5 to 25% by mass, and the gas barrier resin (C) is 5 to 25% by mass. However, the total of the three components (A) to (C) is not more than 100% by mass. When the materials are mixed in the blending ratio falling within the above range, the barrier performance of the structure can be efficiently enhanced, and the strength reduction of the structure can be minimized. Preferably, the structure of the present invention is composed of the three components of the polyolefin (A), the acid-modified polyolefin (B) and the gas barrier resin (C).

(Other Components)

In addition to the three components of the polyolefin (A), the acid-modified polyolefin (B) and the gas barrier resin (C), a polyolefin color master batch as a colorant as well as various types of copolyolefins and ionomers of thermoplastic elastomers, EEA (ethylene-ethyl acrylate), EMA (ethylene-methyl acrylate) and the like for modification may be contained in the above-mentioned mixed source material.

Further, the mixed source material may contain a recycled resin formed by grinding the resin solid from the purged debris and burr to form in the production process for the polyolefin-based structure, as well as the defectives of the produced olefin structures. The mixing ratio of the recycled resin is, for minimizing the reduction in the barrier performance, the reduction in the strength of the polyolefin-based structure, and the discoloration thereof, preferably 60% by mass or less as the content in the mixed source material, more preferably 50% by mass or less, even more preferably 40% by mass or less. The lower limit is not specifically defined, but is preferably 1% by mass or more. When a recycled resin is mixed as a partial substitute for the polyolefin to be used, the content of the metaxylylene group-containing polyamide in the polyolefin-based structure may increase. Also in such a case, for the purpose of preventing significant reduction in the strength of the molded articles, the recycled resin is blended so that the blending ratio of the above-mentioned (A), (B) and (C) could fall within the above-mentioned range.

[Polyolefin-Based Structure]

With no limitation thereto, the polyolefin-based structure in the present invention may be any one capable of being molded through the discharge port of a die head, and preferably includes a hollow molded article, a sheet-molded article, and a thermoformed article produced by secondary working of thermoforming of the sheet-molded article. The thickness of the polyolefin-based structure is, though not limited thereto, 0.5 to 5 mm or so, preferably 1 to 3 mm. When the thickness of the structure is 0.5 mm or more, the barrier performance and the strength of the structure can be high. When 5 mm or less, weight reduction and cost reduction of the structure can be realized and, in addition, the effect of enhancing the barrier performance in the present invention can be readily exhibited.

The gas barrier resin (C) is dispersed in a form of layers in the structure, and the dispersed gas barrier resin (C) may partly form a continuous phase. The gas barrier resin (C) dispersed in a form of layers is preferably in a dispersion state where the resin exists alternately to the other resin component in the thickness direction of the structure. The polyolefin-based structure is generally a single-layered structure formed of a mixed source material containing the above-mentioned components (A) to (C).

The polyolefin-based structure in the present invention is, more specifically, a molded article of a bottle, a tank, a drum, a cup, a tray, a pipe, a sheet or the like, and is molded according to the production method to be mentioned below. In the case where the polyolefin-based structure is a bottle-shaped, tank-shaped or drum-shaped container, the structure is preferably produced according to a direct blow method. In the case where the structure is a sheet molded article having a sheet form, it is preferably produced according to a T-die method. The resultant sheet molded article may be further thermoformed through vacuum forming, pressure forming or the like into secondary molded containers, etc.

[Production Method for Polyolefin-Based Structure]

A production method for the polyolefin-based structure of the present invention is described below.

The production method of the present invention is to produce a polyolefin-based structure from the mixed source material mentioned above, using a molding machine. In this method, the mixed source material is extruded out through a molding machine to give a polyolefin-based structure in which the gas barrier resin (C) is dispersed in a form of layers in the polyolefin (A). The molding machine for use in the present invention is equipped with a single-screw extruder, a die head and a communication portion for feeding the mixed source material from the single-screw extruder to the die head.

The production method is not specifically limited, and any known method is employable including a direct blow method, a T-die method, etc. A direct blow method is preferred. The die head may be any of a T-die, a straight die or a cross head die, but is preferably a cross head die.

One embodiment of the production method of the present invention is described below with reference to FIG. 1. The following description is to demonstrate an example of forming a container according to a direct blow method using a cross head die.

As shown in FIG. 1, a molding machine 10 in this embodiment is equipped with a single-screw extruder 11, a die head 12, and an adaptor 13 for fitting the die head 12 to the top of the single-screw extruder 11. The adaptor 13 is a communication portion for feeding a mixed source material from the single-screw extruder 11 to the die head 12.

The single-screw extruder 11 is equipped with a cylinder 20, a screw 21 running inside the cylinder 20, a hopper 22 fitted to the edge on the upstream side of the cylinder 20, and a screw drive unit 23 for rotating the screw 21.

The screw 21 has a threading 25 spirally formed on the side face of the screw axis. The outer diameter D of the threading 25 is slightly smaller than the inner diameter of the inner periphery of the cylinder and is set to be constant.

The screw 21 has a supply zone 21A, a compression zone 21B to follow the supply zone 21A, and a metering zone 21C to follow the compression zone 21B, in that order from the base part to the top part. The supply zone 21A is a range where the screw is given the threading 25 and where the threading groove depth (also referred to as height or screw depth) is kept constant from the threading start. The compression zone 21B is a range where the groove depth becomes gradually shallow. The metering zone 21C is a range where the groove depth is shallow and is kept constant at the top of the screw.

The length of the supply zone, the compression zone and the metering zone, L1, L2 and L3 is about 0.2 to 0.5, respectively, relative to the total thereof of 1, more preferably about 0.25 to 0.40, respectively.

Regarding the screw shape in the present invention, the compression ratio (C/R) thereof is preferably 1.5 to 3.5, more preferably 1.8 to 3.0. The compression ratio (C/R) is expressed by a ratio of the resin capacity (volume) by one pitch of the supply zone 21A to the resin capacity (volume) by one pitch of the metering zone 21C. When the compression ratio thereof is 1.5 or more, the screw can effectively impart the shear effect to the mixed source material and the other components than the gas barrier resin (C) can be thereby fully plasticized under the temperature condition in the present invention. On the other hand, when the compression ratio is 3.5 or less, the gas barrier resin (C) in the mixed source material can be prevented from being dispersed in fine particles inside the single-screw extruder 11.

The die head 12 is provided with a die body 31 having an inside hollow part and a mandrel 33 arranged inside the hollow part to form a cylindrical die hole 32 between it and the die body 31.

The cylindrical die hole 32 opens on the lower side to be a discharge port 32A while a guide path 35 is connected thereto on the upper side. The guide path 35 is connected to an outlet 11A of the single-screw extruder 11, running through the inside of the adaptor (communication portion) 13 from the die head 12. The die hole 32 is not limited to a cylindrical one and may be any one having a pipe-like form.

The mandrel 33 shown in FIG. 1 is one inlayed from the top of the die body 31, but in the present invention, the type of the mandrel to be used is not limited. As shown in FIGS. 2A, 2B, 3A and 3B, the mandrel 33 may be one that is connected to the inner wall of the die body 31 by the support 38 (or 38A, 38B).

In general, in use of any type of mandrel, a confluent section of a so-called resin weld is formed, and in the structure of the present invention, a gas barrier resin (C) does not almost exist around the weld, and therefore the barrier performance of the structure may often lower. Consequently, the area of the weld in the structure is preferably smaller, and from this viewpoint, it is desirable to use a mandrel of the type that is connected to the inner wall of the die body 31 by the support 38 (or 38A, 38B) like in FIGS. 2A, 2B, 3A and 3B.

Figure 3A:
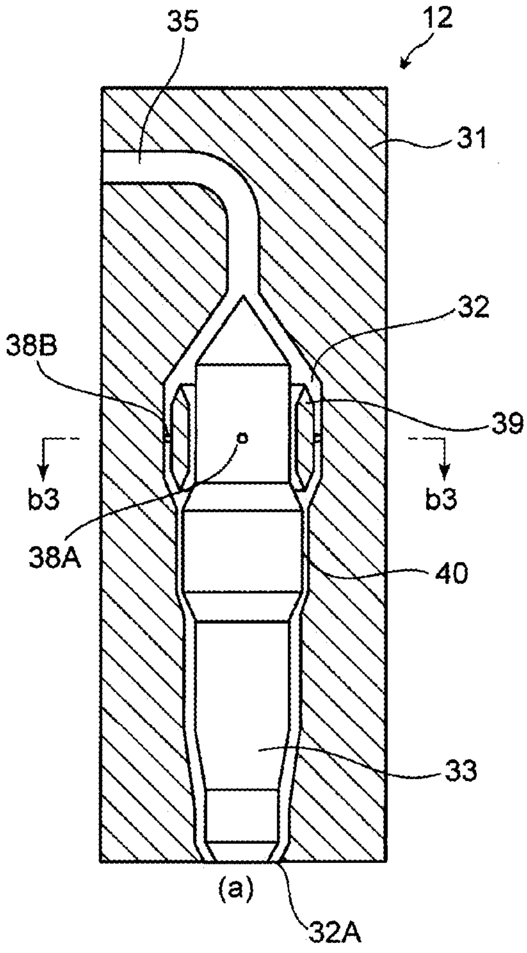
FIG. 3A is a vertical cross-sectional view showing a die head for use in one embodiment of the present invention.
Figure 3B:
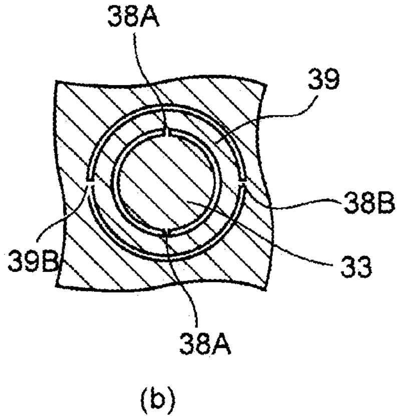
FIG. 3B is a horizontal cross-sectional view at b3-b3.

Further, more preferably as shown in FIGS. 3A and 3B, a cylindrical part 39 is arranged between the die body 31 and the mandrel 33, and the mandrel 33 is connected to the inner wall of the die body 31 via the cylindrical part 39 and the supports 38A and 38B arranged inside and outside the cylindrical part 39, and between the inside and the outside of the cylindrical part 39, the position of the supports 38A and 38B are deviated in the circumferential direction. Having the configuration, the resultant structure can be so planned that weld does not run through the wall surface, and the barrier performance thereof can be thereby bettered.

The number of the supports 38, 38A and 38B is preferably 2 to 4 each. Falling within the range, the barrier performance degradation owing to weld can be minimized, and in addition, the necessary strength for connecting the die body 31 and the mandrel 33 with each other can be secured. In addition, the shape of the supports 38, 38A and 38B is, from the viewpoint of weld prevention, preferably a thin plate, and more preferably, the upper and lower parts thereof are sharply angled.

In general, the mandrel 33 may have a large diameter part so that the die hole 32 of the die head 12 may have a narrowest part 40 where the width is the narrowest. The cylindrical part 39, and the supports 38, 38A and 38B are generally arranged on the upstream side of the narrowest part 40.

The single-screw extruder 11 is provided with, for example heaters C1, C2 and C3 in that order from the base end of the screw 21 toward the top end of the screw. The heaters C1, C2 and C3 each heat the parts of the cylinder corresponding to the supply zone 21A, the compression zone 21B and the metering zone 21C of the screw, respectively, to thereby control the temperature (cylinder temperature).

The heaters C1, C2 and C3 may be ones capable of heating the entire cylinder corresponding to the supply zone 21A, the compression zone 21B and the metering zone 21C to be at the temperature to be mentioned (T1, T2), but for example, the heaters C1 and C2 may be ones capable of heating a major part (for example, 80% or more) of the cylinder corresponding to the supply zone 21A and the compression zone 21B to be at the temperature (T1) to be mentioned below. Similarly, the heater C3 may be one capable of heating a major part of the cylinder corresponding to the metering zone 21C to be at the temperature (T2) to be mentioned below. For such temperature control, it is desirable that the single-screw extruder has at least three heaters arranged therein.

A heater AD is arranged to surround the adaptor 13, and the adaptor 13 is kept at the temperature T3 to be mentioned below, by the heater AD. The die head 12 is provided with an additional heater not shown, and the entire area thereof is kept at the temperature T4 to be mentioned below, by the heater.

The single-screw extruder 11 plasticizes and kneads the mixed source material having been put into the base side of the screw 21 from the hopper 22, while moving it by the screw 21, and discharges the resultant mix through the outlet 11A. The mixed source material discharged from the outlet 11A of the single-screw extruder 11 is introduced into the die hole 32 via the guide path 35, and is extruded out as a cylindrical parison through the discharge port 32A. The parison is thereafter formed into a container (polyolefin-based structure) according to a known method. Specifically, the parison is, at the timing when extruded out in a suitable length, sandwiched between the molds not shown, then inflated by air blown into the parison, and thereafter airtightly stuck to the cooled molds by which a container is formed. The thus-formed container is taken out by demolding.

The components of the mixed source material to be fed via the hopper 22 may be in any form of solids such as powder, pellets or the like, but pellets are preferred.

In the present invention, the mixed source material is extruded out from the molding machine under the condition satisfying the following formulae (1) to (4) to give a polyolefin-based structure.

$$Am+10^\circ\ C.\leq T1\leq Cm-10^\circ\ C. \quad (1)$$

$$Cm-30^\circ\ C.\leq T2\leq Cm+30^\circ\ C. \quad (2)$$

$$Cm-10^\circ\ C.\leq T3\leq Cm+50^\circ\ C. \quad (3)$$

$$Cm-30^\circ\ C.\leq T4\leq Cm+30^\circ\ C. \quad (4)$$

In the above formulae (1) to (4), T1 is the cylinder temperature (° C.) in the section corresponding to the supply zone and the compression zone of the screw in the single-screw extruder. T2 is the cylinder temperature (° C.) in the section corresponding to the metering zone of the screw in the single-screw extruder. T3 is the temperature of the communication portion, and T4 is the temperature (° C.) of the die head.

Am is the melting point of the polyolefin (A), Cm is the melting point of the gas barrier resin (C).

Specifically, in the single-screw extruder 11, the temperature T1 is the cylinder temperature in the section to be heated by the heaters C1 and C2. The temperature T2 is the cylinder temperature (° C.) in the section to be heated by the heater C3. Further, the temperature T3 is the temperature of the adaptor 13 heated by the heater AD, and the temperature T4 is the temperature of the die head 12 heated by the heater (not shown) provided for the die head.

In the present invention, the temperature T1 is controlled to be (Am+10° C.) or higher, and accordingly, the polyolefin (A) in the mixed source material put into the hopper 22 is melted in the region corresponding to the supply zone 21A and the compression zone 21B inside the cylinder 20. On the other hand, the temperature T1 is fully lower than the melting point Cm of the gas barrier resin (C), and therefore the gas barrier resin (C) is not sufficiently softened in these regions and is not almost particulated. Consequently, the gas barrier resin (C) is, when put into the machine as pellets, kept almost in the form of pellets in some degree in the region corresponding to the supply zone 21A and the compression zone 21B.

When the cylinder temperature T1 is lower than (Am+10° C.), the polyolefin (A) could not melt in the supply zone 21A and the compression zone 21B, and if so, there may occur some trouble that the mixed source material could not be fully kneaded in the single-screw extruder 11. On the other hand, when the cylinder temperature T1 is higher than (Cm−10° C.), the gas barrier resin (C) is completely softened and particulated in the region corresponding to the supply zone 21A and the compression zone 21B and, as a result, the component (C) could hardly be dispersed in a form of layers in the mixed resin extruded out through the discharge port 32A of the die head.

From the above viewpoints, the temperature T1 is preferably Am+20° C.≤T1≤Cm−20° C.

Along with the polyolefin (A), the acid-modified polyolefin (B) may also melt, and therefore the temperature T1 is preferably higher than the melting point Bm of the acid-modified polyolefin (B), more preferably not lower than (Bm+5° C.), even more preferably not lower than (Bm+10° C.).

In the present invention, the cylinder temperature in the section corresponding to the supply zone 21A and the compression zone 21B may be the same as or may differ from each other. In the case where the temperature differs from each other, the cylinder temperature in the section corresponding to the compression zone 21B is preferably higher than the cylinder temperature in the section corresponding to the supply zone 21A.

Next, in the present invention, the cylinder temperature T2 is controlled as above, and the gas barrier resin (C) is further softened in the region corresponding to the metering zone 21C inside the cylinder 20. However, the gas barrier resin (C) is not softened more than needs in the region corresponding to the metering zone 21C, and like in the supply zone 21A and the compression zone 21B, the resin is not fully particulated. Consequently, the mixed resin discharged out of the single-screw extruder 11 is in a state where the solid gas barrier resin (C) that is not fully particulated is dispersed in a mixture of the melted polyolefin (A) and the acid-modified polyolefin (B).

Here, when the cylinder temperature T2 is lower than (Cm−30° C.), the gas barrier resin (C) could not be fully heated and therefore could not be fully softened in the adaptor 13 (communication portion) as mentioned below. When higher than (Cm+30° C.), the gas barrier resin (C) would melt in the region corresponding to the metering zone 21C or would soften more than needs.

The cylinder temperature T2 is generally higher than the cylinder temperature T1. The cylinder temperature T2 is preferably lower than the melting point Cm of the gas barrier resin (C), more preferably (Cm−20° C.)≤T2<Cm. By controlling the cylinder temperature T2 to fall within the above temperature range in that manner, the gas barrier resin (C) can be prevented from being melted or particulated in the region corresponding to the metering zone 21C and can therefore be softened suitably.

Next, in the present invention, the temperature T3 of the adaptor (communication portion) 13 is set at a temperature not lower than the melting point Cm of the gas barrier resin (C)−10° C., as described above, and therefore, the gas barrier resin (C) is in a sufficiently softened state in the adaptor 13. Here, the gas barrier resin (C) is supplied from the single-screw extruder 11 in a state not fully particulated in the melted components (A) and (B), as described above. Consequently, the gas barrier resin (C) is softened in a state not fully particulated in the adaptor 13, and then fed to the die hole 32 in that state.

When the temperature T3 is lower than the melting point Cm of the gas barrier resin (C)−10° C., the gas barrier resin (C) could not be fully softened before sent to the die hole 32. When the temperature T3 is higher than (melting point Cm+50° C.), a thermal history is given too much to the mixed source material and therefore the quality of the structure may worsen and, in addition, the gas barrier resin (C) would be dispersed more than needs.

In the present invention, in order that any excessive thermal history is not given to the mixed source material and in order that the component (C) would not be dispersed more than needs, preferably, Cm−10° C.≤T3≤Cm+30° C., and more preferably Cm−5° C.≤T3≤Cm+15° C. Preferably, the temperature T3 is higher than the temperature T2.

Next, the gas barrier resin (C) softened in a state not fully particulated in the adaptor 13 passes through the die hole 32 whose width is narrower than that of the guide path 35 and is therefore formed into thin layers as given a shear force, and dispersed in a form of layers in the polyolefin (A). In general, the width of the die hole 32 is not constant, and when the width of the narrowest part thereof is smaller, the gas barrier resin (C) could be more readily dispersed in a form of layers. The width of the narrowest part is preferably 0.1 to 2 mm, more preferably 0.2 to 1.5 mm, most preferably 0.3 to 1.2 mm.

In the present invention, when the temperature T4 of the die head is lower than (Cm−30° C.), the gas barrier resin (C) is solidified inside the die head therefore often causing extrusion failures. When the temperature T4 of the die head is higher than (Cm+30° C.), a thermal history would be given to the mixed source material too much so that the quality of the structure may worsen and the melt viscosity of the mixed source material may lower to cause drawdown.

In the present invention, from the viewpoint of not giving any superfluous thermal history to the mixed source material and of bettering the extrusion capability and the moldability, the temperature T4 of the die head is preferably Cm−15° C.≤T4≤Cm+15° C., more preferably Cm−10° C.≤T4≤Cm+10° C.

In the present invention, the temperature T5 of the resin extruded out through the discharge port 32A (resin outlet temperature T5) is preferably lower than the melting point Cm of the gas barrier resin (C), and more preferably satisfies the following formula (5):

$$Cm-30°\ C.\leq T5\leq Cm-5°\ C. \quad (5).$$

When the resin outlet temperature is lower than the melting point Cm, the gas barrier resin (C) is not almost melted throughout the entire route in the molding machine 10 and can be therefore readily dispersed in a form of layers in the polyolefin-based structure to enhance the barrier performance of the structure. When the resin outlet temperature is Cm−30° C.≤T5≤Cm−5° C., the gas barrier resin (C) can be readily extended in a form of layers in a non-melted softened state in the die head 12 to more highly enhance the barrier performance.

The above description is to demonstrate a case where a container is molded according to a direct blow method using a cross head die, and the same may apply to other cases of using any other die such as a T-die or using any other molding method. For example, in the case of using a T-die, the mixed resin sent from the adaptor to the T-die is extruded out through the discharge port of the die hole formed between lips and is formed into a sheet.

As the die head, any one having two or more die holes in one die head may be used. Through two or more die holes, plural polyolefin-based structures can be produced at a time and the productivity can be enhanced. In the present invention, the gas barrier resin (C) is dispersed in a form of layers mainly inside the die hole, as described above. Consequently, even though the guide path 35 is branched, the layer of the gas barrier resin (C) does not separate and therefore a polyolefin-based structure having high barrier performance can be obtained.

In the case where a die head having two or more die holes is used, for example, an embodiment may be employed where the guide path 35 is branched in two or more, and each branched path is connected to each die hole.

The above description has demonstrated a case where a so-called full flight screw with no mixing part is used in the single-screw extruder. However, in the present invention, a screw having a double flight structure in the compression zone 21B, or a mixing screw having a mixing section in the metering zone 21C may also be used. The mixing section is, though not limited thereto, for example, one having a pin-like projections arranged therein, or a barrier type one. Maddock is referred to as one example of the barrier type mixing section. In the case of using the barrier type one, the cylinder temperature T2 in the section corresponding to the metering zone 21C preferably satisfies the following condition (2'):

$$Cm-30°\ C.\leq T2\leq Cm-5°\ C. \quad (2').$$

When a barrier type mixing section is arranged in the metering zone 21C, the mixed source material would receive a great shear force in the metering zone 21C. Since the temperature in the metering zone 21C increases owing to the shear force heat generation, the cylinder temperature T2 in the section corresponding to the metering zone 21C is controlled to be low as described above, whereby the gas barrier resin (C) in the metering zone 21C may be prevented from being softened more than needs or from being melted. In the case where the mixing section is arranged, the length L3 of the metering zone means the length that includes the length of the mixing section.

As described above, in the present invention, the temperature of the molding machine 10 is controlled under the above-mentioned conditions (1) to (4), and therefore in the polyolefin-based structure, the gas barrier resin (C) can be suitably dispersed in a form of layers in the polyolefin (A). Accordingly, the barrier performance of the polyolefin-based structure can be enhanced.

EXAMPLES

Hereinafter, the present invention will be described in more detail with reference to Examples. In the Examples and so on, various evaluations were carried out by the following methods.

(1) MFR (g/10 Min) of Polyolefin (A) and Acid-Modified Polyolefin (B)

A melt indexer manufactured by Toyo Seiki Seisaku-Sho was used according to JIS K7210. At the temperature and under the load based on the Appendix B, the polyethylene resin was measured at 190° C. and 2.16 kgf, and the polypropylene resin was measured at 230° C. and 2.16 kgf.

(2) Density (g/$Cm^3$) of Polyolefin (A) and Acid-Modified Polyolefin (B)

By using a sheet forming device equipped with an extruder, a T-die, a cooling roll, a puller, etc., a single-layer sheet having a thickness of about 1 mm was formed. Subsequently, a test piece having a size of 50 mm in length and 50 mm in width was cut from the thus formed sheet, and the true specific gravity thereof was measured using a true specific gravity meter.

(3) Acid Value (Mg/g) of Acid-Modified Polyolefin (B)

The measurement was carried out by neutralization titration according to JIS K0070. 1 g of the acid-modified polyethylene was accurately weighed and dissolved in 100 mL of xylene at about 120° C. while stirring. After completely dissolving the acid-modified polyethylene therein, a phenolphthalein solution was added thereto, and neutralization titration was carried out by using a 0.1 mol/L potassium hydroxide ethanol solution whose concentration was accurately determined in advance. The acid value was calculated according to the formula (7) from the dropping amount (T), the factor of the 0.1 mol/L potassium hydroxide ethanol solution (f), 1/10 of the formula weight 56.11 of potassium hydroxide (5.611), and the mass of the acid-modified polyethylene (S):

$$\text{Acid value}=T\times f\times 5.611/S \quad (7).$$

(4) Relative Viscosity of Metaxylylene Group-Containing Polyamide 0.2 g of the metaxylylene group-containing polyamide was accurately weighed and dissolved in 20 mL of 96% sulfuric acid at 20 to 30° C. while stirring. After completely dissolving the metaxylylene group-containing polyamide therein, a 5-mL of the resulting solution was rapidly sampled and placed in a Canon-Fenske viscometer. After the viscometer was left in a thermostatic chamber at 25° C. for 10 minutes, a dropping time (t) of the solution was measured. Also, a dropping time (t0) of the 96% sulfuric acid itself was measured under the same conditions. The relative viscosity was calculated according to the following formula (8) from the t and t0:

$$\text{Relative Viscosity} = t/t0 \tag{8}$$

(5) Water Content of Metaxylylene Group-Containing Polyamide

Using a Curl-Fischer moisture titration meter (manufactured by Hiranuma Sangyo, trade name: AQ-2000), 0.5 g of the metaxylylene group-containing polyamide was kept heated at 235° C. for 30 minutes, and the vaporized moisture amount was measured.

(6) Free Volume of Metaxylylene Group-Containing Polyamide

Ten sheets of unstretched 100-μm film of metaxylylene group-containing polyamide were piled up and fixed, and using a high time-resolution positron lifetime measuring device of Takasaki Advanced Radiation Research Institute, Japan Atomic Energy Agency, the lifetime t3 of orthopositronium (o-Ps) was measured in an atmosphere at 25° C. and 50% RH (relative humidity). Based on the thus-measured value t3, the pore radius R of the metaxylylene group-containing polyamide was measured according to the formula (9), and the free volume ($=4/3 \pi R^3$) thereof was calculated.

The unstretched film used in this experiment is a film whose elevated temperature crystallization heat quantity in DSC falls within a range of 20 to 40 J/g, and the range indicates that the crystallization degree of film is almost the same within the range.

$$1/\tau_3 = 2\left[1 - \frac{R - \Delta R}{R} + \frac{1}{2\pi}\sin\left(\frac{2\pi(R - \Delta R)}{R}\right)\right] \tag{9}$$

(7) Melting Point of Polyolefin (A), Acid-Modified Polyolfin (B), and Gas Barrier Resin (C)

Using a differential scanning calorimeter (manufactured by Shimadzu Seisaku-sho, trade name: DSC-60), the sample was melted by heating from room temperature up to 260° C. at a heating rate of 10° C./min under nitrogen stream, and then using liquid nitrogen, the sample was rapidly cooled, and thereafter the sample was again heated from room temperature up to 260° C. at a heating rate of 10° C./min. Next, on the resultant chart, the melting peak temperature of the sample was read.

(8) Barrier Performance of Container

Into each of the containers produced in Examples and Comparative Examples, 200 mL of toluene was put, and then the opening of the mouth portion of the container was heat-sealed with an aluminum deposited film, and the container was capped and the total mass thereof was measured. Subsequently, the container in which toluene was enclosed was kept in a thermostatic chamber at 40° C., and the total mass was measured every 24 hours. The measurement was continued until the mass loss became stable. The mass loss per day is referred to as a toluene penetration rate (g/bottle·day).

(9) Barrier Performance of Sheet

The sheet produced in Examples and Comparative Examples was blanked into a disc with ϕ70 mm to be a sample. Next, an aluminium container with flange having a volume of 120 mL was filled with 100 mL of toluene, the test sample was put to cover the opening, and a screw cap having an opening with 455 mm is fitted thereover to airtightly seal up the container with the test sample. The total weight of the container was measured, and then the container was stored in a thermostatic chamber at 40° C., and the total mass was measured every 24 hours. The measurement was continued until the mass loss became stable. The mass loss per day is referred to as a toluene penetration rate (g·mm/m²·day).

(10) Drop Test

Each of the containers produced in Examples and Comparative Examples was filled with 400 mL of water and closed by a cap. Then, the temperature of the container was controlled for 4 hours in a thermostatic chamber at 23° C. Next, in a thermostatic chamber at 23° C., the container was dropped with its bottom facing downward onto concrete from a height of 2 m 30 times in a continuous manner. The number of broken containers in the test among 5 containers was counted.

<Polyolefin (A) Used>

HDPE-1: Novatec HD HB420R (trade name), high-density polyethylene manufactured by Japan Polyethylene Corporation, MFR: 0.2 (190° C., 2.16 kgf), density: 0.956 g/cm³, melting point: 133° C.

HDPE-2: KEIYO Polyethy B5500 (trade name), high-density polyethylene manufactured by Keiyo Polyethylene, MFR: 0.03 (190° C., 2.16 kgf), density: 0.954 g/cm³, melting point: 135° C.

HDPE-3: HI-ZEX 6200BX (trade name), high-density polyethylene manufactured by Prime Polymer Co. Ltd., MFR: 0.9 (190° C., 2.16 kgf), density: 0.954 g/cm³, melting point: 132° C.

HDPE-4: KEIYO Polyethy T8150 (trade name), high-density polyethylene manufactured by Keiyo Polyethylene, MFR: 1.4 (190° C., 2.16 kgf), density: 0.960 g/cm³, melting point: 135° C.

PP-1: Novatec PP EC9 (trade name), polypropylene manufactured by Japan Polypropylene Corporation, MFR: 0.5 (230° C., 2.16 kgf), density: 0.9 g/cm³, melting point: 163° C.

PP-2: Novatec PP FY6 (trade name), polypropylene manufactured by Japan Polypropylene Corporation, MFR: 2.5 (230° C., 2.16 kgf), density: 0.9 g/cm³, melting point: 163° C.

<Acid-Modified Polyolefin (B) Used>

AD-1: ADMER AT1000 (trade name), acid-modified polyethylene manufactured by Mitsui Chemicals, Incorporated, MFR: 1.8 (190° C., 2.16 kgf), density: 0.927 g/cm³, acid value: 9.5 mg/g, melting point: 123° C.

AD-2: ADMER AT2490 (trade name), acid-modified polyethylene manufactured by Mitsui Chemicals, Incorporated, MFR: 0.3 (190° C., 2.16 kgf), density: 0.923 g/cm³, acid value: 18.7 mg/g, melting point: 120° C.

AD-3: ADMER NB550 (trade name), acid-modified polyethylene manufactured by Mitsui Chemicals, Incorporated, MFR: 0.9 (190° C., 2.16 kgf), density: 0.92 g/cm³, acid value: 3.2 mg/g, melting point: 123° C.

AD-4: ADMER QE800 (trade name), acid-modified polypropylene manufactured by Mitsui Chemicals, Incorporated, MFR: 9.0 (230° C., 2.16 kgf), density: 0.91 g/cm$^3$, acid value: 9.5 mg/g, melting point: 164° C.

<Gas Barrier Resin (C) Used>

[Polyamide]

(Metaxylylene Group-Containing Polyamide)

PA-1: MX-Nylon S6121 (trade name), polymetaxylylenadipamide manufactured by Mitsubishi Gas Chemical Company Inc., relative viscosity: 3.5, water content: 0.03%, free volume: 0.055 nm$^3$, melting point: 238° C.

PA-1A: Prepared from PA-1 by storing at 40° C. and 90% RH for 5 hours to have a water content of 0.45%.

PA-2: MX-Nylon #6000 (trade name), polymetaxylylenadipamide manufactured by Mitsubishi Gas Chemical Company Inc., relative viscosity: 2.1, water content: 0.3%, free volume: 0.052 nm$^3$, melting point: 238° C.

PA-3: MX-Nylon S7007 (trade name), isophthalic acid-copolymerized polymetaxylylenadipamide manufactured by Mitsubishi Gas Chemical Company Inc., relative viscosity: 2.6, water content: 0.03%, free volume: 0.054 nm$^3$, melting point: 229° C.

(Other Polyamide)

PA-4: UBE Nylon 1022B (trade name), nylon 6 manufactured by Ube Industries, Ltd., melting point: 220° C.

PA-5: UBE Nylon 5033B (trade name), nylon 666 manufactured by Ube Industries, Ltd., melting point: 196° C.

PA-6: UBE Nylon 3030U (trade name), nylon 12 manufactured by Ube Industries, Ltd., melting point: 178° C.

[Ethylene-Vinyl Alcohol Copolymer Resin]

EVOH: Eval FS101B (trade name) manufactured by Kuraray Co. Ltd., melting point: 183° C.

[Polyethylene Terephthalate]

PET: Unipet BK-2180 (trade name) manufactured by Nippon Unipet Co. Ltd., melting point: 247° C.

Example 101

Using a single-layer direct blow container molding machine equipped with a full flight screw-inserted single-screw extruder having a diameter of 50 mm, L/D of 25, a length ratio of supply zone/compression zone/metering zone=33/33/33% and a compression ratio of 2.5, an adaptor, a cylindrical die with a parison controller (die head: width of the narrowest part of die hole, 1 mm), a mold, a clamping device, a cooler, etc., a bottle was molded in the manner mentioned below. Through the extruder hopper, mixed pellets that had been dry-blended in a ratio of HDPE-1/AD-1/PA-1=80/10/10 (mass %) were put into the single-screw extruder, and at a screw rotation rate of 30 rpm, a parison was extruded out through the cylindrical die, and the resulting parison was formed into a bottle with a threaded plug, which had an internal volume of 400 mL and a thickness of 1 mm, by a direct blow method. During this, the cylinder temperature of the extruder was set at C1/C2/C3=180/190/230° C., the adaptor temperature was at 240° C., and the die head temperature was at 240° C. C1, C2 and C3 each mean the cylinder temperature in the section corresponding to the supply zone, the compression zone and the metering zone, respectively.

Figure 4:
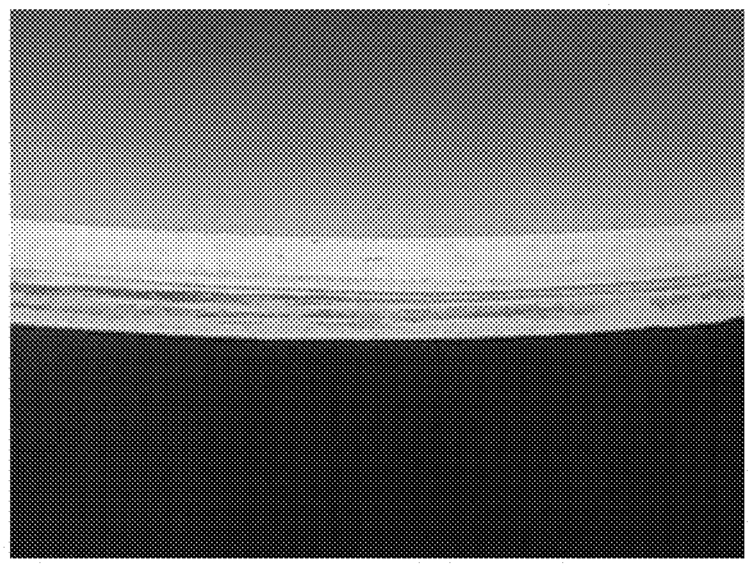
FIG. 4 is a picture of the container obtained in Example 101 cut in the horizontal direction where the cross section is enlarged.

With respect to the obtained bottle, the toluene penetration rate was measured and the drop test was carried out. The results are shown in Table 1. Further, the bottle obtained in Example 101 was cut in the horizontal direction, and an enlarged picture of the cross section is shown in FIG. 4. The layer of the metaxylylene group-containing polyamide was stained with a diluted tincture of iodine.

Examples 102 to 109

Bottles with a threaded plug were molded in the same manner as in Example 101 except that the kinds and the compounding amounts of the polyolefin (A), the acid-modified polyolefin (B), and the gas barrier resin (C) and the preset temperature profile were changed as shown in Table 1.

With respect to the obtained bottles, the toluene penetration rate was measured and the drop test was carried out. The results are shown in Table 1.

Example 110

A bottle with a threaded plug was molded in the same manner as in Example 101 except that the container and the burr produced in Example 101 were crushed and dry-blended in a ratio of HDPE-1/AD-1/PA-1/crushed product=48/6/6/40 (mass %).

With respect to the obtained bottle, the toluene penetration rate was measured and the drop test was carried out. The results are shown in Table 1.

Example 111

A bottle with a threaded plug was molded in the same manner as in Example 101 except that the container and the burr produced in Example 101 were crushed and dry-blended in a ratio of HDPE-1/AD-1/PA-1/crushed product=32/4/4/60 (mass %).

With respect to the obtained bottle, the toluene penetration rate was measured and the drop test was carried out. The results are shown in Table 1.

Example 112

A bottle with a threaded plug was molded in the same manner as in Example 101 except that a mixing screw having Maddock in the metering zone and having a diameter of 50 mm, L/D of 25, a length ratio of supply zone/compression zone/metering zone=33/33/33% and a compression ratio of 2 was used, the extruder cylinder temperature was set at C1/C2/C3=180/190/220° C., the adaptor temperature was at 250° C. and the die head temperature was at 240° C.

With respect to the obtained bottle, the toluene penetration rate was measured and the drop test was carried out. The results are shown in Table 1.

Example 113

A bottle with a threaded plug was molded in the same manner as in Example 101 except that a single layer direct blow container molding machine equipped with a cylindrical die having two die holes was used.

With respect to the obtained bottle, the toluene penetration rate was measured and the drop test was carried out. The results are shown in Table 1.

Comparative Example 101

A bottle with a threaded plug was molded in the same manner as in Example 101 except that the acid-modified polyolefin (B) and the gas barrier resin (C) were not used and HDPE-1 alone was used as the polyolefin (A).

With respect to the obtained bottle, the toluene penetration rate was measured and the drop test was carried out. The results are shown in Table 1.

Comparative Example 102

A bottle with a threaded plug was molded in the same manner as in Example 101 except that the extruder cylinder temperature was set at C1/C2/C3=210/235/235° C., the adaptor temperature was at 230° C. and the die head temperature was 230° C.

With respect to the obtained bottle, the toluene penetration rate was measured and the drop test was carried out. The results are shown in Table 1.

Comparative Example 103

A bottle with a threaded plug was molded in the same manner as in Example 101 except that a mixing screw having Maddock in the metering zone and having a diameter of 50 mm, L/D of 25, a length ratio of supply zone/compression zone/metering zone=33/33/33% and a compression ratio of 2 was used, the extruder cylinder temperature was set at C1/C2/C3=210/235/235° C., the adaptor temperature was at 230° C. and the die head temperature was at 230° C.

With respect to the obtained bottle, the toluene penetration rate was measured and the drop test was carried out. The results are shown in Table 1.

Comparative Example 104

A bottle with a threaded plug was molded in the same manner as in Example 101 except that a single layer direct blow container molding machine equipped with a cylindrical die having two die holes was used, the extruder cylinder temperature was set at C1/C2/C3=210/235/235° C., the adaptor temperature was at 230° C. and the die head temperature was at 230° C.

With respect to the obtained bottle, the toluene penetration rate was measured and the drop test was carried out. The results are shown in Table 1.

Comparative Example 105

A bottle with a threaded plug was molded in the same manner as in Example 101 except that the container and the burr produced in Example 101 were crushed and dry-blended in a ratio of HDPE-1/AD-1/PA-1/crushed product=48/6/6/40 (mass %), the extruder cylinder temperature was set at C1/C2/C3=210/235/235° C., the adaptor temperature was at 230° C. and the die head temperature was at 230° C.

With respect to the obtained bottle, the toluene penetration rate was measured and the drop test was carried out. The results are shown in Table 1.

Comparative Examples 106 and 107

A bottle with a threaded plug was molded in the same manner as in Example 101 except that, as the gas barrier resin (C), a resin except polyamide was used in place of the metaxylylene group-containing polyamide and the preset temperature in the molding machine was changed as in Table 1.

With respect to the obtained bottle, the toluene penetration rate was measured and the drop test was carried out. The results are shown in Table 1.

Comparative Example 108

A bottle with a threaded plug was molded in the same manner as in Example 101 except that the acid-modified polyolefin (B) and the gas barrier resin (C) were not used and PP-1 alone was used as the polyolefin (A).

With respect to the obtained bottle, the toluene penetration rate was measured and the drop test was carried out. The results are shown in Table 1.

TABLE 1

| | Polyolefin (A) | | | Acid-Modified Polyolefin (B) | | Gas Barrier Resin (C) (metaxylylene group-containing polyamide) | | | Crushed Product | |
|---|---|---|---|---|---|---|---|---|---|---|
| | kind | melting point [° C.] | ratio by mass [%] | kind | ratio by mass [%] | kind | melting point [° C.] | ratio by mass [%] | ratio by mass [%] | Screw Type |
| Example 101 | HDPE-1 | 133 | 80 | AD-1 | 10 | PA-1 | 238 | 10 | — | full flight |
| Example 102 | HDPE-2 | 135 | 80 | AD-1 | 10 | PA-1 | 238 | 10 | — | full flight |
| Example 103 | HDPE-3 | 132 | 80 | AD-1 | 10 | PA-1 | 238 | 10 | — | full flight |
| Example 104 | HDPE-1 | 133 | 80 | AD-2 | 10 | PA-1 | 238 | 10 | — | full flight |
| Example 105 | HDPE-1 | 133 | 80 | AD-3 | 10 | PA-1 | 238 | 10 | — | full flight |
| Example 106 | HDPE-1 | 133 | 80 | AD-1 | 10 | PA-1A | 238 | 10 | — | full flight |
| Example 107 | HDPE-1 | 133 | 80 | AD-1 | 10 | PA-2 | 238 | 10 | — | full flight |
| Example 108 | HDPE-1 | 133 | 80 | AD-1 | 10 | PA-3 | 229 | 10 | — | full flight |
| Example 109 | PP-1 | 163 | 80 | AD-4 | 10 | PA-1 | 238 | 10 | — | full flight |
| Example 110 | HDPE-1 | 133 | 48 | AD-1 | 6 | PA-1 | 238 | 6 | 40 | full flight |
| Example 111 | HDPE-1 | 133 | 32 | AD-1 | 4 | PA-1 | 238 | 4 | 60 | full flight |
| Example 112 | HDPE-1 | 133 | 80 | AD-1 | 10 | PA-1 | 238 | 10 | — | mixing |
| Example 113 | HDPE-1 | 133 | 80 | AD-1 | 10 | PA-1 | 238 | 10 | — | full flight |
| Comparative Example 101 | HDPE-1 | 133 | 100 | — | — | — | — | — | — | full flight |
| Comparative Example 102 | HDPE-1 | 133 | 80 | AD-1 | 10 | PA-1 | 238 | 10 | — | full flight |
| Comparative Example 103 | HDPE-1 | 133 | 80 | AD-1 | 10 | PA-1 | 238 | 10 | — | mixing |
| Comparative Example 104 | HDPE-1 | 133 | 80 | AD-1 | 10 | PA-1 | 238 | 10 | — | full flight |
| Comparative Example 105 | HDPE-1 | 133 | 48 | AD-1 | 6 | PA-1 | 238 | 6 | 40 | full flight |
| Comparative Example 106 | HDPE-1 | 133 | 80 | AD-1 | 10 | EVOH | 183 | 10 | — | full flight |
| Comparative Example 107 | HDPE-1 | 133 | 80 | AD-1 | 10 | PET | 247 | 10 | — | full flight |

TABLE 1-continued

| | | | | | | | | | | |
|---|---|---|---|---|---|---|---|---|---|---|
| Comparative Example 108 | PP-1 | 163 | 100 | — | — | — | — | — | — | full flight |

| | Die Discharge Port [number] | Preset Temperature T1 C1 [° C.] | T1 C2 [° C.] | T2 C3 [° C.] | T3 AD [° C.] | T4 die [° C.] | Resin Outlet Temperature T5 [° C.] | Toluene Penetration Rate *1 | Broken Bottles in Dropping [number/5] |
|---|---|---|---|---|---|---|---|---|---|
| Example 101 | 1 | 180 | 190 | 230 | 240 | 240 | 227 | 0.02 | 0/5 |
| Example 102 | 1 | 180 | 190 | 230 | 240 | 240 | 227 | 0.03 | 0/5 |
| Example 103 | 1 | 180 | 190 | 230 | 240 | 240 | 228 | 0.02 | 0/5 |
| Example 104 | 1 | 180 | 190 | 230 | 240 | 240 | 227 | 0.02 | 0/5 |
| Example 105 | 1 | 180 | 190 | 230 | 240 | 240 | 228 | 0.03 | 0/5 |
| Example 106 | 1 | 180 | 190 | 230 | 240 | 240 | 227 | 0.02 | 0/5 |
| Example 107 | 1 | 180 | 190 | 230 | 240 | 240 | 227 | 0.02 | 0/5 |
| Example 108 | 1 | 180 | 190 | 220 | 230 | 230 | 217 | 0.02 | 0/5 |
| Example 109 | 1 | 180 | 190 | 230 | 240 | 240 | 227 | 0.06 | 0/5 |
| Example 110 | 1 | 180 | 190 | 230 | 240 | 240 | 227 | 0.04 | 0/5 |
| Example 111 | 1 | 180 | 190 | 230 | 240 | 240 | 228 | 0.23 | 0/5 |
| Example 112 | 1 | 180 | 190 | 220 | 250 | 240 | 228 | 0.02 | 0/5 |
| Example 113 | 2 | 180 | 190 | 230 | 240 | 240 | 227 | 0.02 | 0/5 |
| Comparative Example 101 | 1 | 180 | 190 | 230 | 240 | 240 | 227 | 2.8 | 0/5 |
| Comparative Example 102 | 1 | 210 | 235 | 235 | 230 | 230 | 227 | 0.50 | 0/5 |
| Comparative Example 103 | 1 | 210 | 235 | 235 | 230 | 230 | 228 | 2.6 | 0/5 |
| Comparative Example 104 | 2 | 210 | 235 | 235 | 230 | 230 | 227 | 1.1 | 0/5 |
| Comparative Example 105 | 1 | 210 | 235 | 235 | 230 | 230 | 227 | 0.58 | 0/5 |
| Comparative Example 106 | 1 | 150 | 160 | 170 | 185 | 185 | 178 | 2.1 | 0/5 |
| Comparative Example 107 | 1 | 180 | 190 | 240 | 250 | 250 | 238 | 4.6 | 0/5 |
| Comparative Example 108 | 1 | 180 | 190 | 230 | 240 | 240 | 228 | 9.5 | 0/5 |

*1: unit of toluene penetration rate = [g/bottle · day]

As obvious from the results in Examples 101 to 113 mentioned above, when the temperature condition of the molding machine is set to satisfy the conditions (1) to (4), the gas barrier resin (C) of a metaxylylene group-containing polyamide can be dispersed suitably in a form of layers in the resultant polyolefin-based structures to thereby improve the barrier performance of the structures. However, in Example 107, since the water content of the metaxylylene group-containing polyamide was high, bubbles formed in the bottle and therefore the barrier performance and the strength in dropping worsened as compared with those in the other Examples.

On the other hand, in Comparative Examples 102 and 105, the cylinder temperature C2 in the section corresponding to the compression zone (that is, temperature T1) was set to be higher than the condition (1), and therefore the gas barrier resin (C) softened more than needs and were partly particulated and, as a result, the resin could not be sufficiently dispersed in a form of layers and the barrier performance could not therefore be improved sufficiently. Similarly, also in Comparative Example 103, the gas barrier resin (C) softened more than needs and, in addition, the resin was, as given a large shear force in the mixing zone, completely particulated, and therefore the barrier performance of the structure could not almost be improved. In Comparative Example 104, after the gas barrier resin (C) was dispersed in a form of layers in the extruder, the layers of the gas barrier resin (C) were halved since the flow path was branched and, as a result, the barrier performance of the structure worsened more than that in Comparative Example 102 where the preset temperature profile and the resin used were the same between the two.

Further, in Comparative Examples 106 and 107, the preset temperature profile in the molding machine satisfied the conditions (1) to (4), but in Comparative Example 106, EVOH was compatible with HDPE and was therefore almost particulated and, as a result, the barrier performance of the structure could not almost be improved. In Comparative Example 107, PET was dispersed in a form of layers, but the adhesiveness thereof to HDPE was poor and the barrier performance of PET against toluene was poor, and therefore the barrier performance of the structure worsened. In Comparative Examples 101 and 108 not containing the gas barrier resin (C), the barrier performance of the structure was not sufficient.

Examples 114 to 116

Examples 114 to 116 are examples of using a polyamide other than the metaxylylene group-containing polyamide as the gas barrier resin (C), in which bottles with a threaded plug were molded in the same manner as in Example 101 except that the kind of the gas barrier resin (C) and the preset temperature profile were changed as shown in Table 2.

With respect to the obtained bottles, the toluene penetration rate was measured and the drop test was carried out. The results are shown in Table 2.

Comparative Examples 109 to 111

Comparative Examples 109 to 111 are examples of using a polyamide other than the metaxylylene group-containing polyamide as the gas barrier resin (C), which were carried out in the same manner as in Examples 114 to 116 except that the preset temperature profile was changed as in Table 2.

below. Through the extruder hopper, mixed pellets that had been dry-blended in a ratio of HDPE-4/AD-1/PA-1=80/10/10 (mass %) were put into the single-screw extruder, and at a screw rotation rate of 100 rpm, the mixture was extruded out through the T-die to form a sheet having a thickness of 1 mm and a width of 15 cm. During this, the cylinder temperature of the extruder was set at C1/C2/C3=160/170/220° C., the adaptor temperature was at 230° C., and the

TABLE 2

| | Polyolefin (A) | | | Acid-Modified Polyolefin (B) | | Gas Barrier Resin (C) (other polyamide) | | | Crushed Product | |
|---|---|---|---|---|---|---|---|---|---|---|
| | kind | melting point [° C.] | ratio by mass [%] | kind | ratio by mass [%] | kind | melting point [° C.] | ratio by mass [%] | ratio by mass [%] | Screw Type |
| Example 114 | HDPE-1 | 133 | 80 | AD-1 | 10 | PA-4 | 220 | 10 | — | full flight |
| Example 115 | HDPE-1 | 133 | 80 | AD-1 | 10 | PA-5 | 196 | 10 | — | full flight |
| Example 116 | HDPE-1 | 133 | 80 | AD-1 | 10 | PA-6 | 178 | 10 | — | full flight |
| Comparative Example 109 | HDPE-1 | 133 | 80 | AD-1 | 10 | PA-4 | 220 | 10 | — | full flight |
| Comparative Example 110 | HDPE-1 | 133 | 80 | AD-1 | 10 | PA-5 | 196 | 10 | — | full flight |
| Comparative Example 111 | HDPE-1 | 133 | 80 | AD-1 | 10 | PA-6 | 178 | 10 | — | full flight |

| | Die Discharge Port [number] | Preset Temperature T1 C1 [° C.] | T1 C2 [° C.] | T2 C3 [° C.] | T3 AD [° C.] | T4 die [° C.] | Resin Outlet Temperature T5 [° C.] | Toluene Penetration Rate *1 | Broken Bottles in Dropping [number/5] |
|---|---|---|---|---|---|---|---|---|---|
| Example 114 | 1 | 170 | 180 | 210 | 220 | 220 | 208 | 0.15 | 0/5 |
| Example 115 | 1 | 150 | 160 | 190 | 200 | 200 | 189 | 0.18 | 0/5 |
| Example 116 | 1 | 150 | 160 | 170 | 180 | 180 | 169 | 0.92 | 0/5 |
| Comparative Example 109 | 1 | 200 | 215 | 215 | 210 | 210 | 209 | 0.95 | 0/5 |
| Comparative Example 110 | 1 | 170 | 195 | 195 | 190 | 190 | 192 | 1.0 | 0/5 |
| Comparative Example 111 | 1 | 150 | 175 | 175 | 170 | 170 | 171 | 2.2 | 0/5 |

*1: unit of toluene penetration rate = [g/bottle · day]

The above Examples 114 to 116 are compared with Comparative Examples 109 to 111. Even in the case where a polyamide other than the metaxylylene group-containing polyamide was used as the gas barrier resin (C), the gas barrier performance was bettered by setting the temperature profile in the molding machine to satisfy the conditions (1) to (4).

In Comparative Examples 109 to 111, the cylinder temperature C2 in the section corresponding to the compression zone (that is, the temperature T1) was set to be higher than the condition (1), and therefore the gas barrier resin (C) softened more than needs and were partly particulated and, as a result, the resin could not be sufficiently dispersed in a form of layers so that the barrier performance of the structure could not be fully bettered.

Example 201

Using a single-layer sheet molding machine equipped with a full flight screw-inserted single-screw extruder having a diameter of 25 mm, L/D of 25, a length ratio of supply zone/compression zone/metering zone=33/33/33% and a compression ratio of 2.5, an adaptor, a T-die (width of the narrowest part of die hole: 0.5 mm), a chill roll, a take-up unit, etc., a sheet was formed in the manner mentioned T-die temperature was at 230° C. C1, C2 and C3 each mean the cylinder temperature in the section corresponding to the supply zone, the compression zone and the metering zone, respectively.

With respect to the obtained sheet, the toluene penetration rate was measured. The result is shown in Table 3.

Examples 202 to 206

Sheets were formed in the same manner as in Example 201 except that the kinds and the compounding amounts of the polyolefin (A), the acid-modified polyolefin (B), and the gas barrier resin (C) and the preset temperature profile were changed as shown in Table 3.

With respect to the obtained sheets, the toluene penetration rate was measured. The results are shown in Table 3.

Comparative Example 201

A sheet was formed in the same manner as in Example 201 except that the acid-modified polyolefin (B) and the gas barrier resin (C) were not used and HDPE-4 alone was used as the polyolefin (A).

With respect to the obtained sheet, the toluene penetration rate was measured. The result is shown in Table 3.

Comparative Example 202

A sheet was formed in the same manner as in Example 201 except that the extruder cylinder temperature was set at C1/C2/C3=160/170/220° C., the adaptor temperature was at 220° C. and the die head temperature was 220° C.

With respect to the obtained sheet, the toluene penetration rate was measured. The result is shown in Table 3.

Comparative Example 203

A sheet was formed in the same manner as in Example 201 except that the extruder cylinder temperature was set at C1/C2/C3=210/230/230° C., the adaptor temperature was at 230° C. and the die head temperature was 230° C.

With respect to the obtained sheet, the toluene penetration rate was measured. The result is shown in Table 3.

Comparative Example 204

A sheet was formed in the same manner as in Example 201 except that the acid-modified polyolefin (B) and the gas barrier resin (C) were not used and PP-2 alone was used as the polyolefin (A).

With respect to the obtained sheet, the toluene penetration rate was measured. The result is shown in Table 3.

TABLE 3

| | Polyolefin (A) | | | Acid-Modified Polyolefin (B) | | Gas Barrier Resin (C) (metaxylylene group-containing polyamide) | | | Preset Temperature | | | | | Resin Outlet Temper-ature | Toluene Penetra-tion |
|---|---|---|---|---|---|---|---|---|---|---|---|---|---|---|---|
| | | melting | ratio | | ratio | | melting | ratio | T1 | | T2 | T3 | T4 | | |
| | kind | point [° C.] | by mass [%] | kind | by mass [%] | kind | point [° C.] | by mass [%] | C1 [° C.] | C2 [° C.] | C3 [° C.] | AD [° C.] | die [° C.] | T5 [° C.] | Rate *1 |
| Example 201 | HDPE-4 | 135 | 80 | AD-1 | 10 | PA-1 | 238 | 10 | 160 | 170 | 220 | 230 | 230 | 228 | 0.7 |
| Example 202 | HDPE-4 | 135 | 80 | AD-2 | 10 | PA-1 | 238 | 10 | 160 | 170 | 220 | 230 | 230 | 228 | 0.7 |
| Example 203 | HDPE-4 | 135 | 80 | AD-3 | 10 | PA-1 | 238 | 10 | 160 | 170 | 220 | 230 | 230 | 228 | 1.2 |
| Example 204 | HDPE-4 | 135 | 80 | AD-1 | 10 | PA-2 | 238 | 10 | 160 | 170 | 220 | 230 | 230 | 228 | 0.7 |
| Example 205 | HDPE-4 | 135 | 80 | AD-1 | 10 | PA-3 | 229 | 10 | 160 | 170 | 210 | 220 | 220 | 218 | 0.8 |
| Example 206 | PP-2 | 163 | 80 | AD-4 | 10 | PA-1 | 238 | 10 | 160 | 170 | 220 | 230 | 230 | 228 | 3.6 |
| Comparative Example 201 | HDPE-4 | 135 | 100 | — | — | — | — | — | 160 | 170 | 220 | 230 | 230 | 228 | 154 |
| Comparative Example 202 | HDPE-4 | 135 | 80 | AD-1 | 10 | PA-1 | 238 | 10 | 160 | 170 | 220 | 220 | 220 | 218 | 33 |
| Comparative Example 203 | HDPE-4 | 135 | 80 | AD-1 | 10 | PA-1 | 238 | 10 | 210 | 230 | 230 | 230 | 230 | 228 | 111 |
| Comparative Example 204 | PP-2 | 163 | 100 | — | — | — | — | — | 160 | 170 | 220 | 230 | 230 | 228 | 528 |

*1: unit of toluene penetration rate = [g · mm/m$^2$ · day]

As described above, in Examples 201 to 206 where sheets were formed through a T-die, the gas barrier resin (C) was dispersed suitably in a form of layers by controlling to the temperature profile of T1 to T4 to satisfy the conditions (1) to (4), and the barrier performance of the sheets was thereby bettered. On the other hand, in Comparative Example 202, the adaptor temperature T3 did not satisfy the condition (3) and was low, and therefore the gas barrier resin (C) could not soften suitably and could not be dispersed in a form of layers, and as a result, the barrier performance could not be bettered. In Comparative Example 203, the temperature T1 was higher than the above condition (1), and therefore the gas barrier resin (C) was softened more than needs and was partly particulated so that the resin could not be dispersed sufficiently in a form of layers and the barrier performance of the sheet could not be improved sufficiently. In Comparative Examples 201 and 204, the gas barrier resin (C) was not incorporated and therefore the barrier performance of the sheets could not be bettered.

The invention claimed is:

1. A method for producing a polyolefin-based structure from a mixed source material comprising 60 to 90% by mass of a polyolefin (A), 5 to 35% by mass of an acid-modified polyolefin (B) and 5 to 35% by mass of a gas barrier resin (C) composed of polyamide, using a molding machine, wherein:

the molding machine is equipped with a single-screw extruder which has a screw running inside a cylinder, a die head, and a communication portion for feeding the mixed source material from the single-screw extruder to the die head, and the mixed source material is extruded out through the molding machine under the temperature condition satisfying the following (1) to (4) to give a polyolefin-based structure in which the gas barrier resin (C) is dispersed in a form of layers in the polyolefin (A):

$$Am+10°\ C. \leq T1 \leq Cm-10°\ C. \quad (1)$$

$$Cm-30°\ C. \leq T2 \leq Cm+30°\ C. \quad (2)$$

$$Cm-10°\ C. \leq T3 \leq Cm+50°\ C. \quad (3)$$

$$Cm-30°\ C. \leq T4 \leq Cm+30°\ C. \quad (4)$$

wherein T1 is a cylinder temperature in a section corresponding to a supply zone and a compression zone of the screw in the single-screw extruder; T2 is a cylinder temperature in a section corresponding to a metering zone of the screw in the single-screw extruder; T3 is a temperature of the communication portion; T4 is a temperature of the die head; Am is a melting point of the polyolefin (A); and Cm is a melting point of the gas barrier resin (C).

2. The method for producing a polyolefin-based structure according to claim 1, wherein the temperature T2 is lower than the melting point Cm of the gas barrier resin (C).

3. The method for producing a polyolefin-based structure according to claim 1, wherein the melting point (Cm) of the gas barrier resin (C) is higher than the melting point (Am) of the polyolefin (A) and the melting point difference (Cm−Am) is 20 to 150° C.

4. The method for producing a polyolefin-based structure according to claim 1, wherein a temperature T5 of the resin being extruded out through the discharge port of the die head satisfies the following formula (5):

$$Cm-30^\circ\ C. \leq T5 \leq Cm-5^\circ\ C. \quad (5).$$

5. The method for producing a polyolefin-based structure according to claim 1, wherein the screw has a barrier-type mixing section in the metering zone, and the temperature T2 satisfies the following condition:

$$Cm-30^\circ\ C. \leq T2 \leq Cm-5^\circ\ C.$$

6. The method for producing a polyolefin-based structure according to claim 1, wherein the die head has two or more die holes.

7. The method for producing a polyolefin-based structure according to claim 1, wherein the mixed source material contains 1 to 60% by mass of a recycled resin obtained from a resin solid generated in a production step for the polyolefin-based structure.

8. The method for producing a polyolefin-based structure according to claim 1, wherein a melt flow rate of the polyolefin (A) is 0.01 to 10 (g/10 min).

9. The method for producing a polyolefin-based structure according to claim 1, wherein a melt flow rate of the acid-modified polyolefin (B) is 0.1 to 10 (g/10 min).

10. The method for producing a polyolefin-based structure according to claim 1, wherein an acid value of the acid-modified polyolefin (B) is 2 to 30 mg/g.

11. The method for producing a polyolefin-based structure according to claim 1, wherein the gas barrier resin (C) is a metaxylylene group-containing polyamide.

12. The method for producing a polyolefin-based structure according to claim 11, wherein a relative viscosity of the metaxylylene group-containing polyamide is 1.5 to 4.5.

13. The method for producing a polyolefin-based structure according to claim 11, wherein a water content of the metaxylylene group-containing polyamide is 0.001 to 0.5%.

14. The method for producing a polyolefin-based structure according to claim 11, wherein a free volume of the metaxylylene group-containing polyamide, as measured according to a positron annihilation technique, is 0.045 to 0.060 $nm^3$.

15. The method for producing a polyolefin-based structure according to claim 1, wherein the polyolefin-based structure is a hollow molded article.

16. The method for producing a polyolefin-based structure according to claim 1, wherein the polyolefin-based structure is a sheet-molded article or a thermoformed article thereof.

* * * * *